(12) United States Patent
Rao et al.

(10) Patent No.: US 8,140,556 B2
(45) Date of Patent: Mar. 20, 2012

(54) TECHNIQUES FOR AUTOMATED GENERATION OF QUERIES FOR QUERYING ONTOLOGIES

(75) Inventors: Aditya Ramamurthy Rao, Mysore (IN); Pravin Prakash, Ernakulam (IN); Narni Rajesh, Hyderabad (IN); Bhaskar Jyoti Ghosh, Patna (IN); Keshava Rangarajan, Foster City, CA (US); Sudharsan Krishnamurthy, Newark, CA (US); Nagaraj Srinivasan, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 549 days.

(21) Appl. No.: 12/356,314

(22) Filed: Jan. 20, 2009

(65) Prior Publication Data

US 2010/0185643 A1 Jul. 22, 2010

(51) Int. Cl.
*G06F 17/30* (2006.01)
(52) U.S. Cl. ....................................................... 707/759
(58) Field of Classification Search .................. 707/4, 5, 707/759; 717/177
See application file for complete search history.

(56) References Cited

U.S. PATENT DOCUMENTS

| | | | |
|---|---|---|---|
| 6,629,097 B1 | 9/2003 | Keith | |
| 7,155,715 B1 * | 12/2006 | Cui et al. | 717/177 |
| 7,249,100 B2 | 7/2007 | Murto et al. | |
| 7,426,526 B2 | 9/2008 | Chen et al. | |
| 7,761,480 B2 | 7/2010 | Toledano et al. | |
| 7,827,169 B2 | 11/2010 | Enenkiel | |
| 2002/0174117 A1 | 11/2002 | Nykanen | |
| 2004/0098358 A1 | 5/2004 | Roediger | |
| 2004/0213409 A1 | 10/2004 | Murto et al. | |
| 2005/0182792 A1 | 8/2005 | Israel et al. | |
| 2005/0234889 A1 | 10/2005 | Fox et al. | |
| 2006/0048155 A1 | 3/2006 | Wu et al. | |
| 2006/0053098 A1 | 3/2006 | Gardner et al. | |
| 2006/0053172 A1 | 3/2006 | Gardner et al. | |
| 2006/0165040 A1 | 7/2006 | Rathod et al. | |
| 2006/0184617 A1 | 8/2006 | Nicholas et al. | |
| 2007/0038609 A1 | 2/2007 | Wu | |
| 2007/0055691 A1 | 3/2007 | Statchuk | |
| 2007/0106933 A1 | 5/2007 | Nene et al. | |
| 2007/0150387 A1 | 6/2007 | Seubert et al. | |
| 2007/0162467 A1 | 7/2007 | Wolber et al. | |
| 2007/0192351 A1 | 8/2007 | Liu et al. | |
| 2007/0208697 A1 | 9/2007 | Subramaniam et al. | |
| 2007/0226242 A1 | 9/2007 | Wang et al. | |
| 2007/0239674 A1 | 10/2007 | Gorzela | |
| 2007/0299813 A1 | 12/2007 | Subramaniam et al. | |
| 2008/0005194 A1 | 1/2008 | Smolen et al. | |

(Continued)

OTHER PUBLICATIONS

U.S. Appl. No. 12/393,872, filed Feb. 26, 2009, Rao et al.

(Continued)

*Primary Examiner* — Etienne Leroux
(74) *Attorney, Agent, or Firm* — Kilpatrick Townsend & Stockton LLP (57) ABSTRACT

Techniques for simplifying querying of ontologies. In one embodiment, one or more queries for querying an ontology are automatically generated in a language suitable for querying the ontology. A user may enter a query in a simple language such as a natural language query. In response, one or more queries capable of querying the ontology are automatically generated in a second language. The automatically generated queries may, for example, be in SPARQL or PL/SQL. The one or more automatically generated queries may then be used to query one or more ontologies.

21 Claims, 3 Drawing Sheets

U.S. PATENT DOCUMENTS

| | | | |
|---|---|---|---|
| 2008/0021881 A1 | 1/2008 | Subramaniam et al. | |
| 2008/0091448 A1 | 4/2008 | Niheu et al. | |
| 2008/0126476 A1 | 5/2008 | Nicholas et al. | |
| 2008/0133960 A1 | 6/2008 | Wong et al. | |
| 2008/0168420 A1 | 7/2008 | Sabbouh | |
| 2008/0183674 A1 | 7/2008 | Bush et al. | |
| 2008/0215519 A1* | 9/2008 | Runge et al. | 706/47 |
| 2008/0275844 A1 | 11/2008 | Buzsaki et al. | |
| 2009/0077094 A1 | 3/2009 | Bodain | |
| 2009/0150735 A1 | 6/2009 | Israel et al. | |
| 2009/0292685 A1* | 11/2009 | Liu et al. | 707/5 |
| 2010/0010974 A1* | 1/2010 | Chieu et al. | 707/4 |
| 2010/0017606 A1 | 1/2010 | Bradley et al. | |
| 2010/0057702 A1 | 3/2010 | Ghosh et al. | |
| 2010/0070496 A1 | 3/2010 | Ghosh | |
| 2010/0070517 A1 | 3/2010 | Ghosh et al. | |

OTHER PUBLICATIONS

"An Introduction to RDF and the Jena RDF API," pp. 1-16, downloaded on Dec. 29, 2009 from URL: http://jena.sourceforge.net/tutorial/RDF_API/index.html.

"Automatic Classification and Taxonomy Generation," Autonomy, pp. 1-3, downloaded on Sep. 10, 2008 from URL: http://www.autonomy.com/content/Functionality/idol-functionality-categorization/index.en.html.

Bechhofer, S., et al, "OWL Web Ontology Language Reference," W3C Recommendation Feb. 10, 2004, pp. 1-71.

"Business Components for Java (BC4J)-Feature Overview," pp. 1-5, downloaded on Apr. 17, 2008 from URL: http://www.oracle.com/technology/products/jdev/htdocs/bc4j9irc_datasheet.html.

"Classification, Clustering and Information Visualization with Oracle Text," An Oracle White Paper, Feb. 2003, 7 pages.

"Conceptual Search," Autonomy, pp. 1-2, downloaded on Sep. 10, 2008 from URL: http://www.autonomy.com/content/Functionality/idol-functionality-conceptual-search/index.en.html.

"Developing Semantic Web Applications using the Oracle Database 10g RDF Data Model," presented at Oracle Open World 2006, 40 pages.

"FAST ESP," FAST—Solutions—Search—FAST ESP, pp. 1-2, downloaded on Sep. 10, 2008 from URL: http://www.fastsearch.com/13a.aspx?m=1031.

Fast ESP®, "Powering Enterprise Search with Fast ESP®," Copyright 2008, 13 pages.

FAST ESP™, "The world's most intelligent, secure, high-performance search platform," FAST ESP Product Sheet, Copyright 2008, 2 pages.

FAST ESP™, "The world's most intelligent, secure, high-performance search platform," FAST ESP Datasheet, Copyright 2008, 8 pages.

"IDOL Server," Autonomy, pp. 1-8 downloaded on Sep. 10, 2008 from URL: http://www.autonomy.com/content/Products/products-idol-server/index.en.html.

"Information Visualization with Oracle 10g Text," An Oracle White Paper, Oct. 2005, 17 pages.

"Jena Adaptor Release 2.0 for Oracle Database—README," Aug. 2008, pp. 1-9.

"Jena Ontology API," pp. 1-29, last modified on Feb. 24, 2009, downloaded on Dec. 29, 2009 from URL: http://jena.sourceforge.net/ontology/index.html.

Jockers, M. L., "POS Tagging XML with xGrid and the Stanford Log-linear Part-of-Speech Tagger," May 29, 2008, pp. 1-5 downloaded from URL: http://www.stanford.edu/~mjockers/cgi-bin/drupal/node/17.

Muench, S., "Building a Web Store with Struts & BC4J Frameworks," Oracle Technology Network, Oracle Corporation, Sep. 25, 2003, pp. 1-88, downloaded on Apr. 17, 2008 from URL: http://www.oracle.com/technology/sample_code/products/jdev/bc4jtoystore/readme.html.

"Natural Language Processing (NLP)," Autonomy, 2008, 1 page, downloaded on Sep. 10, 2008 from URL: http://www.autonomy.com/content/Functionality/idol-functionality-nlp/index.en.html.

"New Features in Oracle Text with Oracle Database 11g Release 1," an Oracle White Paper, May 2007, 9 pages.

"New Query Features in Secure Enterprise Search 10.1.8.2," An Oracle White Paper, Oct. 2007, 9 pages.

"Oracle 9i XML Developer's Kits Guide— XDK," Release 2 (9.2), Mar. 2002, 22 pages.

"Oracle® Database," Semantic Technologies Developer's Guide, 11g Release 1 (11.1), B28397-02, Sep. 2007, 96 pages.

"Oracle® Secure Enterprise Search," Administrator's Guide, 10g Release 1 (10.1.8.2), E10418-01, Sep. 2007, 326 pages.

"Oracle® Spatial," Resource Description Framework (RDF), 10g Release 2 (10.2), B19307-01, Jul. 2005, 62 pages.

"Oracle Application Development Framework Overview," An Oracle White Paper, Feb. 2006, 12 pages.

"Oracle Business Components for Java," An Oracle Technical White Paper, 1999, pp. 1-38, downloaded on Apr. 17, 2008 from URL: http://www.oracle.com/technology/products/jdev/info/techwp20/wp.html.

"Oracle Database 11g Release 2 Semantic Technologies Using the Jena Adaptor for Oracle Database," Sep. 2009, pp. 1-24.

"OracleOwlPrime," From Owl, pp. 1-5, downloaded Sep. 10, 2008 from URL: http://www.w3.org/2007/OWL/wiki/OracleOwlPrime.

"Oracle Semantic Technologies Inference Best Practices with RDFS/OWL," An Oracle White Paper, Sep. 2009, 11 pages.

"Oracle Text," An Oracle Technical White Paper, Jun. 2007, 28 pages.

Pollock, J., "A Semantic Web Business Case," W3C Semantic Web, Copyright 2008, 6 pages.

"RDF Support in Oracle," Oracle USA Inc., Jan. 2008, 13 pages.

"Search on Structured Data," FAST-Solutions-Search-Search on Structured Data, pp. 1-2, downloaded on Sep. 19, 2008 from URL: http://www.fastsearch.com/13a.aspx?m=1104.

"Searching Enterprise Applications (Siebel 7.8 and e-Business Suite 11i) with Oracle Secure Enterprise Search 10.1.8," An Oracle White Paper, Jan. 2007, 25 pages.

"Searching Oracle Content Server (Stellent) with Oracle Secure Enterprise Search 10.1.8," An Oracle White Paper, Sep. 2007, 25 pages.

"Secure Enterprise Search One Search Across Your Enterprise Repositories: Comprehensive, Secure, and Easy to Use," An Oracle White Paper, Jan. 2007, 11 pages.

"Secure Enterprise Search, Version 1 (10.1.8)," An Oracle Technical White Paper, Jan. 2007, 22 pages.

"Secure Enterprise Search Version 10.1.8.2," An Oracle Technical White Paper, Oct. 2007, 30 pages.

"Secure Enterprise Search Version 10.1.8.2," Oracle Secure Enterprise Search Data Sheet, Nov. 2, 2007, pp. 1-10.

"Secure Searching with Oracle Secure Enterprise Search," An Oracle White Paper, Jan. 2007, 17 pages.

"Semantic Data Integration for the Enterprise," An Oracle White Paper, Jul. 2007, 9 pages.

"Semantic Technologies Center," 1 page downloaded on Dec. 29, 2009 from URL: http://www.oracle.com/technology/tech/semantic_technologies/index.html?_template=/oc. .

Sirin, E., et al., "Pellet: A Practical OWL-DL Reasoner," 26 pages downloaded on Dec. 29, 2009 from URL: http://www.mindswap.org/papers/PelletJWS.pdf.

"Text Mining with Oracle Text," An Oracle White Paper, Apr. 2005, 8 pages.

The Stanford Natural Language Processing Group, "Stanford Log-linear Part-Of-Speech Tagger," pp. 1-3, downloaded on Sep. 2, 2008 from URL: http://n1p.stanford.edu/software/tagger.shtml.

W3C®, "OWL Web Ontology Language Guide," W3C Recommendation, Feb. 10, 2004, pp. 1-34.

W3C®, "RDF Primer," W3C Recommendation, Feb. 10, 2004, pp. 1-118.

W3C®, "RDF Semantics," W3C Recommendation, Feb. 10, 2004, pp. 1-41.

W3C®, "RDF Test Cases," W3C Recommendation, Feb. 10, 2004, pp. 1-31.

W3C®, "RDF Vocabulary Description Language 1.0: RDF Schema," W3C Recommendation, Feb. 10, 2004, pp. 1-26.

W3C®, "RDF/XML Syntax Specification (Revised)," W3C Recommendation, Feb. 10, 2004, pp. 1-55.

W3C®, "Resource Description Framework (RFD): Concepts and Abstract Syntax," W3C Recommendation, Feb. 10, 2004, pp. 1-22.

W3C®, "SPARQL Protocol for RDF," W3C Recommendation, Jan. 15, 2008, pp. 1-18.

W3C®, "SPARQL Query Language for RFD," W3C Recommendation Jan. 15, 2008, pp. 1-119.

W3C®, "Web Services Description Language (WSDL) Version 2.0: RDF Mapping," W3C Working Group Note, Jun. 26, 2007, pp. 1-34.

Alonso, O., et al., "Oracle Secure Enterprise Search 10g", Oracle Corporation, 2006, 21 pages.

Author Unknown, "Enterprise Solutions: Google Search Appliance", Google [online], 2007, [retrieved on Apr. 26, 2007]. Retrieved from: http://www.google.com/enterprise/gsa/.

Ford, R., et al., "Secure Searching with Oracle Secure Enterprise Search," Oracle Corporation, 2006, 15 pages.

Risvik, K.,et al., "Search Engines and Web Dynamics," Computer Networks, 2002, vol. 39, No. 3, pp. 289-302.

U.S. Appl. No. 11/742,961 filed May 1, 2007, Office Action dated Jun. 22, 2009, 22 pages.

U.S. Appl. No. 11/742,961 filed May 1, 2007, Final Office Action dated Dec. 31, 2009, 23 pages.

U.S. Appl. No. 11/742,961 filed May 1, 2007, Notice of Allowance dated Mar. 9, 2010, 7 pages.

U.S. Appl. No. 12/201,308 filed Aug. 29, 2008, Office Action dated Jan. 18, 2011, 10 pages.

U.S. Appl. No. 12/201,308 filed Aug. 29, 2008, Final Office Action dated Aug. 26, 2011, 9 pages.

U.S. Appl. No. 12/210,420 filed Sep. 15, 2008, Office Action dated Apr. 6, 2011, 15 pages.

U.S. Appl. No. 12/212,178 filed Sep. 17, 2008, Office Action dated Jan. 21, 2011, 17 pages.

U.S. Appl. No. 12/212,178 filed Sep. 17, 2008, Final Office Action dated Aug. 25, 2011, 18 pages.

U.S. Appl. No. 12/393,872 filed Feb. 26, 2009, Office Action dated Mar. 2, 2011, 8 pages.

U.S. Appl. No. 12/393,872 filed Feb. 26, 2009, Final Office Action dated Aug. 16, 2011, 2 pages.

* cited by examiner

TECHNIQUES FOR AUTOMATED GENERATION OF QUERIES FOR QUERYING ONTOLOGIES

BACKGROUND OF THE INVENTION

Embodiments of the present invention relate to ontologies, and more specifically to techniques for automatically generating queries for querying ontologies.

With the advent of semantic technologies, the importance of ontologies and semantic query languages has grown manifold. An ontology is a formal representation of knowledge. An ontology is a formal representation of a set of concepts within a domain and relationships between the concepts. Ontologies are being used in several different areas including business analytics, enterprise systems, artificial intelligence and the like, and have and the potential to be used in several other fields and applications.

An ontology is typically encoded using an ontology language. Several ontology languages are available. The OWL Web Ontology Language has become the industry standard for representing web ontologies. OWL can be used to explicitly represent the meaning of terms in vocabularies and the relationships between the terms. OWL thus provides facilities for expressing meaning and semantics that goes far beyond the capabilities of languages such as XML. OWL is being developed by the Web Ontology Working Group as part of the W3C Semantic Web Activity. Further information related to OWL may be found at the W3C website.

An ontology may be persisted in memory such as in a database. There are several standard ways of querying and manipulating the data in an ontology using query languages such as RDQL (Resource Description Format Query Language), OWL-QL, SPARQL (SPARQL Protocol and RDF Query Language), and others. Among the ontology query languages, SPARQL is quickly becoming the de facto industry standard.

In order to query an ontology using SPARQL, a user has to first form a SPARQL query which may then be used to query the ontology. For example, current semantic information systems require users to formulate queries directly in SPARQL and then apply the queries to an ontology. End-user SPARQL query formulation is however quite complex given that the user needs to clearly understand the underlying ontological structure (which many application users do not have access to). Additionally, the SPARQL syntax is fairly intricate—this further complicates SPARQL query generation and puts an added burden on the end user. Accordingly, the formulation of ontology queries such as SPARQL queries is difficult and complicated and presents a significant hurdle in the widespread adoption of ontologies.

BRIEF SUMMARY OF THE INVENTION

Embodiments of the present invention provide techniques for simplifying querying of ontologies. In one embodiment, one or more queries for querying an ontology are automatically generated in a language suitable for querying the ontology. A user may enter a query in a simple language such as a natural language query. In response, based upon the user query, one or more queries capable of querying the ontology are automatically generated in a second language. The automatically generated queries may, for example, be in SPARQL or PL/SQL. The one or more automatically generated queries may then be used to query one or more ontologies.

According to an embodiment of the present invention, techniques are provided for generating a query for querying an ontology. A system may receive a first query in a first language, wherein the first query complies with a predefined grammar and comprises one or more terms from a vocabulary used in the ontology. Based upon the first query, one or more queries in a second language are generated, wherein the second language is different from the first language and the ontology is capable of being queried using the one or more queries in the second language. The first query may be for example a natural language query. The second language may be a Resource Description Framework (RDF) compliant query language for querying an ontology such as SPARQL or PL/SQL (e.g., a PL/SQL procedure that can query an ontology persisted in a relational database).

The one or more queries that are automatically generated may be executed against the ontology. Results obtained from executing the one or more queries in the second language against the ontology may then be output.

In one embodiment, a user inputting the first query may be guided in formulating that query by one or more suggestions, wherein the one or more suggestions are based upon the predefined grammar and the vocabulary comprising terms used in the ontology, the predefined grammar based upon a set of one or more rules. As part of the guidance, upon receiving an initial query, it may be determined if the initial query complies with the predefined grammar and comprises one or more terms from the vocabulary.

In one embodiment, generating the one or more queries may comprise processing that comprises parsing the first query to identify a set of terms in the first query, associating a tag with each term in the set of terms, generating one or more representations based upon the set of terms and tags associated with the terms in the set of terms, and generating the one or more queries in the second language based upon the one or more representations. The one or more representations may be in XML format. Further, generating the query may comprise using mapping information to map at least one term in the set of terms to a term used in the ontology, the mapping information providing a mapping between terms and their corresponding terms used in the ontology.

In one embodiment, the one or more queries that are generated in the second language comprise a main query corresponding to the first query and a set of one or more secondary queries configured to gather information in addition to information requested by the first query.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide techniques for simplifying querying of ontologies. In one embodiment, one or more queries for querying an ontology are automatically generated in a language suitable for querying the ontology. A user may enter a query in a simple language such as a natural language query. In response, based upon the user query, one or more queries capable of querying the ontology are automatically generated in a second language. The automatically generated queries may be, for example, in SPARQL or PL/SQL. The one or more automatically generated queries may then be used to query one or more ontologies.

An ontology is a formal representation of knowledge. An ontology is a formal representation of a set of concepts within a domain and relationships between the concepts. An ontology is typically encoded using an ontology language such as OWL, other Resource Description Framework (RDF) compliant languages recommended by the W3C, and the like. OWL is based upon RDF, which is a W3C specification standard for describing resources on the web. OWL can be used to explicitly represent the meaning of terms in vocabularies and the relationships between the terms. OWL thus provides facilities for expressing meaning and semantics that goes far beyond the capabilities of languages such as XML. OWL is being developed by the Web Ontology Working Group as part of the W3C Semantic Web Activity and is geared for use by applications that need to process the content of information instead of just presenting the information to humans. In this manner, OWL facilitates greater machine interpretability of information (e.g., Web content) than other languages.

An ontology, such as an ontology encoded using OWL, may be queried using an ontology query language. Several languages capable of querying an ontology are available including RDF-compliant languages such as RDQL (Resource Description Format Query Language), OWL-QL, SPARQL (SPARQL Protocol and RDF Query Language), and others. Among the ontology query languages, SPARQL is quickly becoming the de facto industry standard. There are also several variants of SPARQL. For purposes of this application, the term "SPARQL" is intended to include SPARQL and/or any variant or version of SPARQL.

As an example, an ontology may be built using ontological statements that include one or more terms, each of which may be a subject, a predicate, an object, or a combination thereof. A subject identifies the entity that the statement describes, a predicate identifies the property, characteristic, relationship, or attribute of the subject, and the object identifies the value of the predicate. As a specific example, an ontology for a purchasing application may include an ontological statement "Purchase Order X has an owner that is Business Corp" or "Purchase Order X is owned by Business Corp." In the example, "Purchase Order X" is the subject, "owner/own" is the predicate, and "Business Corp" is the object. In ontologies encoded using an RDF-compliant language such as OWL, subjects, predicates, and objects may be represented by triples of Uniform Resource Indicators (URIs). The URIs may identify locations of searchable data corresponding to the entities described by ontological statements. Other suitable storage mechanisms and definitions may also be used.

Figure 1:
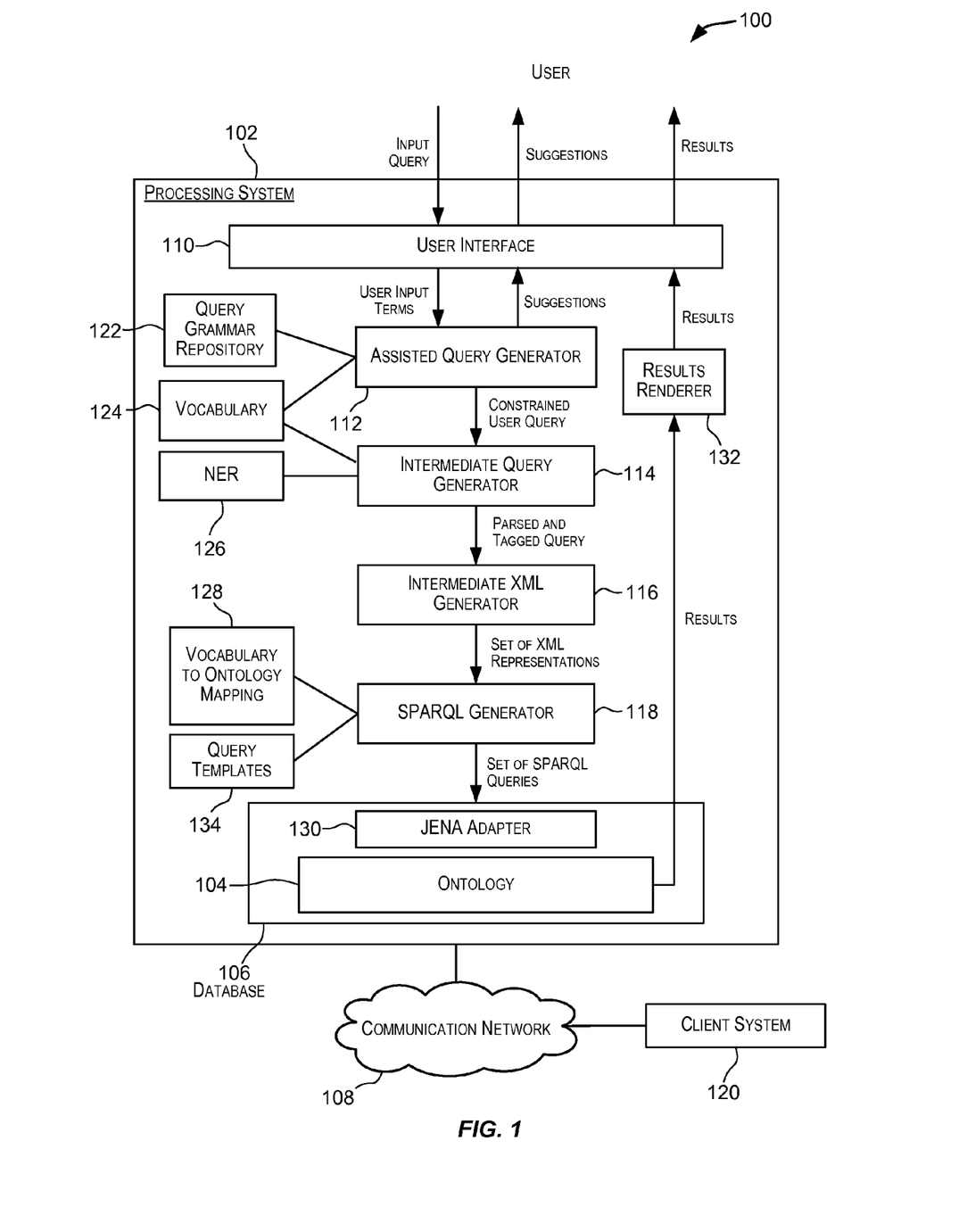
FIG. 1 is a simplified block diagram of a system incorporating an embodiment of the present invention.

FIG. 1 is a simplified block diagram of a system 100 incorporating an embodiment of the present invention. As depicted in FIG. 1, system 100 comprises a processing system 102 that is configured to automate generation of queries that may be used to query an ontology 104. The queries that are automatically generated by processing system 102 may be in PL/SQL that can query ontology 104, SPARQL, or any other RDF-compliant query language. Queries in other languages capable of querying ontology 104 may also be generated.

In the embodiment depicted in FIG. 1, processing system 102 comprises several modules that facilitate automated generation and execution of queries for querying ontology 104. These modules include a user interface module 110, an assisted query generator 112, an intermediate query generator 114, an intermediate XML generator 116, a SPARQL generator 118, a results renderer 132, and a JENA adapter 130. These modules may be implemented in software (e.g., code, instructions, program) executed by a processor of processing system 102, hardware, or combinations thereof. It should be apparent that the modules depicted in FIG. 1 are not intended to limit the scope of the present invention, as recited in the claims. In alternative embodiments, processing system 102 may have more or less modules than the ones depicted in FIG. 1.

Ontology 104 may be encoded using various different languages. In one embodiment, ontology 104 is encoded using an RDF-compliant language such as the OWL web ontology language and may be queried using an RDF-compliant query language such as SPARQL. Ontology 104 may store data for one or more domains. For example, in one embodiment, ontology 104 may store information for an enterprise. As depicted in FIG. 1, ontology 104 is persisted in database 106 that is stored by processing system 102. In alternative embodiments, the ontology may be persisted using other techniques. Ontology 104 may also be stored remotely from processing system 102. For example, ontology 104 may be stored in a remote location accessible to processing system 102 via a communication network such as communication network 108 depicted in FIG. 1. In such an embodiment, queries that are automatically generated by processing system 102 may be communicated to the remote location and executed on the ontology at the remote location. Results from the execution may be communicated back to processing system 102 and then output. While only one ontology 104 is depicted in FIG. 1, it should be apparent that multiple ontologies may be present and queried as described in this application. Further, an ontology may also be stored in a distributed manner in a network environment.

Communication network 108 may be any network configured for data communication such as a local area network (LAN), a wide area network (WAN), the Internet, and the like. Various different communication protocols may be used to communicate data through communication network 108 including wired and wireless protocols.

User interface 110 provides an interface for receiving information from a user of processing system 102 and for outputting information from processing system 102. For example, a user of processing system 102 may enter a query via user interface 110. The user entered query is generally in a language that cannot be used to query ontology 104. The query may be input in a language that has simple syntax, is easy for the user to formulate, and is known to the user. For example, the user may input a natural language (NL) query. Processing system 102 is configured to automatically generate one or more queries capable of querying ontology 104 corresponding to the natural language query received from the user. The automatically generated queries may, for example, be in PL/SQL, SPARQL, or other RDF-compliant query language. The automatically generated queries may then be executed against ontology 104. In this manner, a query input by a user via user interface 110 is automatically translated by processing system 102 to one or more queries that are capable of querying ontology 104. The automatically generated queries may then be executed against ontology 104. The results from executing the SPARQL queries may also be output to the user via user interface 110. The user thus does not need to know SPARQL or other language that is used for querying ontology 104.

For purposes of simplifying the following description, it is assumed that the automatically generated queries are generated in SPARQL. However, this is not intended to limit the scope of the present invention. The queries may also be generated in any other RDF-compliant query language, PL/SQL, or any other language that is capable of querying ontology 104.

In one embodiment, the user may directly input the query to processing system 102. In another embodiment, an input query may also be provided using a client system 120 located remotely from processing system 102 and coupled communicatively with processing system 102 via communication network 108. Client system 120 may be for example a computer, a mobile device such as a cell phone, a personal digital assistant (PDA), and the like. In such an embodiment, user interface module 110 may provide a Web interface that enables a user of client system 120 to both enter information (e.g., natural language queries) to processing system 102 and to receive results from executing the corresponding generated SPARQL queries against ontology 104.

Due to the difficulty and potential loss of precision in converting an arbitrary language query (e.g., a natural language query) into a structured language format like SPARQL, in one embodiment of the present invention, an assisted query approach is used. According to this approach, the user is guided in entering a natural language query that complies to a pre-defined grammar and uses query terms from a vocabulary used in ontology 104. Assisted query generator 112 is configured to perform operations to assist and guide the user in inputting the query.

Assisted query generator 112 ensures that the user-provided query is compliant to a pre-defined grammar. Information related to the pre-defined grammar may be stored in a query grammar repository 122 accessible to assisted query generator 112. Query grammar repository 122 may store pre-defined grammar rules. In one embodiment, a grammar rule may define a set of constraints, which must satisfy any valid (grammatically correct) input query. Query grammar repository 122 is customizable based on organizational needs and based upon the domain contents of ontology 104. Grammar rules may be added or removed from query grammar repository 122 as desired for a particular application. One or more grammar rules may be configured and stored in query grammar repository 122.

In one embodiment, natural language query terms entered by a user via user interface module 110 are passed to assisted query generator 112. Assisted query generator 112 uses the grammar rules to validate the natural language terms entered by the user for compliance with the grammar rules. If the user entered query is not compliant, then suggestions may be provided to the user comprising potential options for entering a compliant query. In this manner, assisted query generator 112 guides the user to form a natural language input query that complies with the predefined grammar. As part of checking grammar compliancy, assisted query generator 112 also suggests terms to the user for completing a query. In one embodiment, the suggested terms are selected from terms that are included in the vocabulary of the ontology. The words suggested by assisted query generator 112 may be extracted from vocabulary 124 accessible to assisted query generator 112. For example, in one embodiment, as the user is keying in a query word, assisted query generator 112 continually validates the query entered against the grammar rules stored in query grammar repository 122 and suggests a set of possible words for completing the query from vocabulary 124.

In one embodiment, assisted query generator 112 ranks the words in the vocabulary 124 appropriately and uses the ranked list in giving suggestions to the user as the query is being entered. Words with higher ranks are preferred to words with lower ranks. Different ranking techniques may be used. According to one ranking technique, a word included in vocabulary 124 has a higher rank than words not included in vocabulary 124 and than ordinary words like a preposition or other words that are not so important like the, is, etc. Other relevance ranking techniques may also be used in alternative embodiments.

An example of a grammar rule may be as follows:
[verb] [low-rank]*[[class] [low-rank]*[attribute] [low-rank]*[instance]*]+

The above rule states that the final assisted natural language query should start with a verb, followed by zero or more low-rank words. Low-rank words may be words such as is, an, the, are, etc. This has to be followed by one or more of a set which consists of the following: a noun, which is represented as a class, followed by zero or more low-rank words, followed by an attribute, followed by zero or more low-rank words, followed by zero or more instances.

A noun may represent a concept or entity in the vocabulary of the information stored by ontology 104. For example, if ontology 104 stores information related to an enterprise, a noun may identify an enterprise concept such as an "Engineering Change Order", "Item", "Purchase Order", etc. and may be referred to as an enterprise noun. Attributes are characteristics of nouns. For example, an enterprise noun "Item" may have attributes such as ID, manufacturer, supplier, etc. An instance represents a specific value given to an attribute. For example, an ID may be given a value='12345', manufacturer='Samsung', etc.

As indicated above, a vocabulary 124 may be provided comprising a collection of terms that are used in the information stored by ontology 104. Assisted query generator 112 may use vocabulary 124 to guide the user in inputting a query such that the query uses terms from vocabulary 124. For example, if ontology 104 stores information for an enterprise, vocabulary 124 may comprise terms used in the enterprise context such as "Engineering Change Order", "ECO", "Item", "Product", "Supplier", etc. and may be referred to as an enterprise vocabulary. In addition to being used by assisted query generator 112, vocabulary may also be used for generating a vocabulary-to-ontology mapping file, as described below.

Assisted query generator 112 thus ensures that the query entered by the user falls within the realm of the grammar that has been seeded. Further, use of vocabulary 124 ensures that the terms entered by the user are within the vocabulary of the ontology thereby increasing the precision of the input query. The output of assisted query generator 112 is an assisted constrained natural language query that conforms to grammar rules stored in query grammar repository 122 and comprises vocabulary stored in vocabulary 124—a query constrained by grammar rules and terms used in ontology 104.

In one embodiment, assisted query generator 112 is an Application Development Framework (ADF) module. Oracle's Application Development Framework (ADF) is a comprehensive productivity layer for J2EE developers that implements a Model-View-Controller (MVC) pattern and simplifies building applications as a set of business services with Web, Wireless, and Rich Client interfaces. ADF accelerates development with ready-to-use J2EE Design Pattern implementations and metadata-driven components and offers a visual and declarative approach to J2EE development.

The assisted constrained natural language query forms the input to intermediate query generator 114. Intermediate query generator 114 is configured to generate an intermediate tagged query corresponding to the constrained natural language query received from assisted query generator 112. In one embodiment, processing performed by intermediate query generator 114 comprises identifying one or more terms, each comprising one or more words, from the constrained query and tagging the identified terms with their corresponding parts-of-speech. The goal is to split the user entered constrained query into individual terms and tag the terms. In one embodiment, intermediate query generator 114 uses a customized version of Stanford's Named Entity Recognizer (NER) 126 to parse the constrained query and identify the words or terms of interest from the constrained query. NER 126 may be trained to recognize nouns and attributes and other parts from constrained natural language query. These identified terms may then be tagged with their corresponding parts-of-speech. During this process, unimportant terms such as conjunctions, helping verbs, and prepositions like 'a', 'the', 'is', 'are', etc. may be eliminated from the query.

Intermediate query generator 114 may use vocabulary 124 to identify the terms and the tags to be associated with the terms. In one embodiment, the identified terms may be tagged using parts-of-speech tags such as verb, noun, pronoun, adverb, attribute, instance, next relation, relational operator, etc. The terms verb, noun, attribute and instance have been described above. Examples of nouns in an enterprise: ECO, item, BOM, Purchase Order, etc. Examples of attributes: status, priority, id, etc. Examples of instances: "ECO117", "high", "open", etc. Next relation stands for the logical operators like AND, OR etc. Relational operator is used to tag operators like =, <=, >= etc. The tagged terms are then used for the generation of intermediate XML representations, as described below.

In one embodiment, the query is parsed one word at a time. Each of the parsed words is then passed to individual functions that check which category the word falls into. Categories may include, for example, Nouns, Attributes, instances, etc. A word is then tagged according to its category and appended to a new sentence and the original query sentence is trimmed. In one embodiment, the user provided constrained query is tagged using a Stanford Natural Language Processor (NLP). In a specific embodiment, the Noun check is performed first, and is done using the trimmed original query sentence. This is done to ensure that nouns that have multiple words in them are not missed, for example: Engineering Change Order, Bill Of Materials, etc. After this, a check is made for attributes, relations, logical operators, and instances. Unimportant words (low-rank words) are removed while generating the tagged output. In this manner, the user provided constrained query is reduced to a set of important terms, with tags identifying them as nouns, attributes, etc.

For example, the constrained natural language query
"Give me ECO Ids with status="open""
may be converted to the following intermediate tagged query in one embodiment
[verb] Give [/verb] [enterprise-noun] ECO [enterprise-noun] [attribute] ID [/attribute] [attribute] status [/attribute] [relational-operator]=[/relational-operator] [instance] 'open' [/instance]
Accordingly, intermediate query generator 114 receives an assisted constrained natural language query as input and outputs an intermediate query with terms tagged with parts-of-speech notations. It should be noted that the parts-of-speech are user configurable.

The intermediate query with tagged terms is then provided to intermediate XML generator 116 that processes the tagged terms to generate one or more intermediate XML representations. The XML representations conform to a fixed intermediate query schema. In this manner, an assisted constrained natural language query entered by the user is transformed into XML format representations. The generated XML representations serve as a normalized form for the user entered natural language queries. In alternative embodiments, formats other than XML may also be used to generate the intermediate representations. As part of the processing, intermediate XML generator 116 gets each term along with its associated tag from the intermediate query generator 114. Intermediate XML generator 116 uses the tag information to fit the associated term into an intermediate XML format. Tag information associated with previous and following terms in the intermediate tagged query may be used to generate the XML representation for a tagged term. The intermediate XML representations are then fed to SPARQL generator 118.

In one embodiment, the tagged tokens or terms are used to generate a set of one or more intermediate Query XML beans. The query may be converted into an XML form using the following schema:

```
<?xml version="1.0" encoding="windows-1252" ?>
<xsd:schema xmlns:xsd="http://www.w3.org/2001/XMLSchema"
      xmlns="http://www.example.org"
      targetNamespace="http://www.example.org"
      elementFormDefault="qualified">
  <xsd:element name="query">
    <xsd:annotation>
      <xsd:documentation>
       A sample element
      </xsd:documentation>
    </xsd:annotation>
    <xsd:complexType>
      <xsd:sequence>
       <xsd:element name="verb" type="xsd:string">
       </xsd:element>
       <xsd:element name="classes" maxOccurs="1">
        <xsd:complexType>
         <xsd:sequence>
          <xsd:element name="classObject" maxOccurs="unbounded">
           <xsd:complexType>
            <xsd:sequence>
             <xsd:element name="attributes">
              <xsd:complexType>
               <xsd:sequence>
                <xsd:element name="attribute"
                  maxOccurs="unbounded">
                 <xsd:complexType>
                  <xsd:sequence>
                   <xsd:element name="values">
                    <xsd:complexType>
                     <xsd:sequence>
                      <xsd:element name="value"
                          maxOccurs="unbounded">
                       <xsd:complexType>
                        <xsd:sequence>
                         <xsd:element name="actualValue"/>
                         <xsd:element name="order"
                             type="xsd:integer"/>
                        </xsd:sequence>
                        <xsd:attribute name="nextRelation"/>
                       </xsd:complexType>
                      </xsd:element>
                     </xsd:sequence>
                    </xsd:complexType>
                   </xsd:element>
                  </xsd:sequence>
```

```
        <xsd:attribute name="name"/>
        <xsd:attribute name="relationship"/>
      </xsd:complexType>
    </xsd:element>
   </xsd:sequence>
  </xsd:complexType>
 </xsd:element>
</xsd:sequence>
<xsd:attribute name="name"/>
</xsd:complexType>
</xsd:element>
</xsd:sequence>
</xsd:complexType>
</xsd:element>
</xsd:sequence>
</xsd:complexType>
</xsd:element>
</xsd:schema>
```

In the above XML format example, there are two children to the root node: a verb child node, which contains verbs like "give", "where", etc, and a classes child node which contains details about the rest of the query. The classes node contains different classObject nodes. Each of them contains the information about a class that comes in the query and its associated attributes and values. The classObject node contains attributes, which point to each of the attributes, which belong to the class. These attributes contain value nodes to represent the values in the query.

As indicated above, a set of XML representations may be generated as output by intermediate XML generator 116. The representations may include a main XML representation that corresponds to the query input by the user and other extra or secondary XML representations corresponding to extra information that is to be supplied to the user (even though not asked explicitly by the user). In one embodiment, in order to get the secondary XMLs, an XML file (InferenceHelper) may be used that contains details of the extra information that needs to be extracted whenever the user searches for a specific pattern. For example, a user may input a query searching for ECOs with status "Open". From a business knowledge perspective, it may be known that a user interested in status of ECOs may also be interested in extra information such as information identifying ECOs with priority high. So this extra information may be provided in the results provided to the user. In one embodiment, this may be done by providing a rule in InferenceHelper.xml such as: If ECO status 'Open' Then ECO Priority 'high'. Several such rules may be included in the InferenceHelper file. Accordingly, given a user provided query, the InferenceHelper file may be used to determine the secondary additional information to be provided to the user. The contents of an example XML file InferenceHelper may be as follows:

```
<?xml version="1.0" encoding="UTF-8"?>
<RulesSeedings>
  <Rule>
    <Anticident>
      <Condition nextRel="NONE">
        <ClassPropertyCombination>[ECO]STATUS
        </ClassPropertyCombination>
        <Value Operator="=">Open</Value>
      </Condition>
    </Anticident>
    <Consequent>
      <Condition nextRel="NONE">
        <ClassPropertyCombination>[ECO]PRIORITY
        </ClassPropertyCombination>
        <Value Operator="=">HIGH</Value>
      </Condition>
    </Consequent>
    <OtherColumnsToBeDisplayed>
      <column>[ECO]DESCRIPTION</column>
      <column>[ECO]ID</column>
      <column>[ECO]CREATION_DATE</column>
      <column>[ECO]OWNER</column>
    </OtherColumnsToBeDispalyed>
  </Rule>
</RulesSeedings>
```

The XML file shown above describes the ECO status and priority example described above. The Anticident tag contains the condition that needs to hold (condition that comes from the user query). The consequent is the extra information that is to be provided to the user if its corresponding Anticident holds. In the example above, if the user enters the query ECO status 'Open', an extra query is generated which is ECO priority 'high'. Each of these queries is used to generate a separate XML representation. The OtherColumnsToBeDispalyed tag lists the attributes that needs to be displayed for the extra query(s) that are generated SPARQL generator 118 is configured to receive the one or more XML representations from intermediate XML generator 116 and convert them to one or more SPARQL queries that can be executed against ontology 104. The one or more SPARQL queries may comprise a main SPARQL query corresponding to the main XML, and secondary queries for the secondary XML representations. The query generated by SPARQL generator 118 conforms to the RDF SPARQL standard. In one embodiment, a separate SPARQL query is generated for each XML representation.

In one embodiment, SPARQL generator 118 uses a vocabulary-to-ontology mapping file 128 to convert the one or more intermediate XML representations to the final one or more SPARQL queries. Vocabulary-to-ontology mapping file 128 may comprise a mapping between the vocabulary terms (e.g., enterprise nouns) and their respective terms in ontology 104. SPARQL generator 118 uses this mapping filed to get mappings from user vocabulary to ontology vocabulary. A user may use different forms to represent a vocabulary term. For example, a user may refer to "Engineering Change Order" as "ECO". Using mapping file 128, SPARQL generator 118 is able to map "ECO" to the term "Engineering Change Order" used in ontology 104. In one embodiment, mapping file 128 encapsulates a conceivable set of alternative representations for the nouns used in ontology 104. Mapping file 128 thus enables a user to use different terms when formulating a natural language input query. Mapping file 128 enables SPARQL generator 118 to normalize the query terms to term(s) used in ontology 104. Mapping file 128 also comprises mappings for namespace to prefixes, which are used in the prefix part of the SPARQL. This is used because each entity in OWL Ontology is identified by a URI. The URI generally contains a namespace pre-pended to the actual entity name.

In one embodiment, as part of generating a SPARQL query, SPARQL generator 118 parses the intermediate XML representation received from intermediate XML generator 116 and finds the nouns and attributes to build the query pattern part of the SPARQL. SPARQL generator 118 then builds the filter condition part of SPARQL by using the attributes and the instances. SPARQL generator 118 then gets the namespace and vocabulary to ontology mappings from the mapping file 128, as described above.

An example of a vocabulary-to-ontology mapping file is shown below:

```xml
<?xml version="1.0" encoding="UTF-8" standalone="no" ?>
<EnterpriseVocabularyMappings xmlns=
"http://www.enterpriseVocabMappings"
    xmlns:xsi="http://www.w3.org/2001/XMLSchema-instance">
  <NaturalLanguageName canonicalName=
  "[ECO]CREATION_DATE"
      name="eco:creationdate">
    <OntologyMapping>
      <OWLElement>v1:UpdateEngineeringChangeOrderList
      </OWLElement>
      <OWLElement>v1:has_InitiationDate</OWLElement>
      <OWLElement>v2:hasvalue</OWLElement>
    </OntologyMapping>
  </NaturalLanguageName>
  <NaturalLanguageName canonicalName=
  "[ECO]CREATION_DATE"
      name="eco:created on">
    <OntologyMapping>
      <OWLElement>v1:UpdateEngineeringChangeOrderList
      </OWLElement>
      <OWLElement>v1:has_InitiationDate</OWLElement>
      <OWLElement>v2:hasvalue</OWLElement>
    </OntologyMapping>
  </NaturalLanguageName>
  <NaturalLanguageName canonicalName=
  "[ECO]CREATION_DATE"
      name="eco:CREATION_DATE">
    <OntologyMapping>
      <OWLElement>v1:UpdateEngineeringChangeOrderList
      </OWLElement>
        <OWLElement>v1:has_InitiationDate</OWLElement>
    <OntologyMapping>
  </NaturalLanguageName>
    <NamespaceMapping
        namespace="http://localhost:8989/EnterpriseObjectLibrary/
        Release2/Core/Common/V2/MERGED_OWL_3#"
        prefix="v2" />
    <NamespaceMapping
        namespace="http://localhost:8989/EnterpriseObjectLibrary/
        Release2/Core/EBO/EngineeringChangeOrder/
        MERGED_OWL_1#" prefix="v1" />
</EnterpriseVocabularyMappings>
```

The example mapping file shown above gives a mapping between commonly used names for the class-attribute pair to its canonical name and term used in the ontology. For example, the first node says that, if the user input contains a class-attribute pair as "eco:creationdate", it can be mapped to the canonical name="[ECO]CREATION_DATE". It also gives a mapping to get to the actual property CREATION_DATE in the ontology. This can be done using UpdateEngineeringChangeOrderList→has_InitiationDate→ hasValue to find the value for the CREATION_DATE property.

In one embodiment, the intermediate main XML representation or bean generated by intermediate XML generator 116 is matched with a template for the actual SPARQL query generation from query templates 134. Depending on the structure of the intermediate XML, there may be a specific template that can be filled to generate the query. This template is filled using values in the bean and the mapping values that are available from vocabulary-to-ontology mapping file 128, to create the actual SPARQL query. In one embodiment, a single template, which can map queries that conform to the grammar that is being used, to the ontology specific SPARQL notation is used. One or more templates may be used in alternative embodiments. In embodiments where multiple templates are available, a context variable may be used to determine the specific template to be used. This context variable may be set during the parsing of the input query as a part of the query bean and used during the SPARQL query generation.

In one embodiment, a template is used that holds a single Class and its attributes. The mapping between contents in XML representation and the SPARQL query may be as follows:

The given Class name and attribute names XML are mapped to the graph pattern of SPARQL query.

The attribute values and relationships in XML are mapped to FILTER condition in the SPARQL query.

The one or more SPARQL queries generated by SPARQL generator 118 may then be executed against ontology 104. The results from executing the SPARQL queries may be output to the user via user interface component 110. The results may also be output to some other processing component. The results may include a main result obtained from executing the main SPARQL query and additional (or secondary) results obtained from executing the secondary SPARQL queries. The results include semantically inferred results. In one embodiment, the results may be displayed possibly as a portlet.

In one embodiment, a results renderer 132 may be used to format the results into a representation that is then output to the user via interface 110. For example, result objects resulting from the execution of the one or more SPARQL queries may be parsed to create an XML, which contains all the result data. The XML format facilitates transfer of the results between applications. The result XML may be transformed using a simple XSLT or some custom in a form to be displayed to the user and the results displayed using user interface 110.

In one embodiment, for example for an Oracle database, a query API in Oracle Jena adapter 130 may be used for executing the one or more SPARQL queries. Jena adapter 130 enables databases, such as Oracle databases, to handle RDF data. Using Jena adapter 130, a database is capable of storing ontologies, running inference rules on ontologies, executing SPARQL queries whose results can be mixed up with normal SQL and PL-SQL, and creating custom rule bases. Jena adapter 130 provides Java APIs that enable users to perform ontology-related functions from within a Java program.

In one embodiment, the results obtained from executing the one or more SPARQL queries may be ranked or ordered according to some ranking or ordering. The ranking or ordering may be based upon various criteria including based on the user or based upon the context of the query. For example, a user might be more interested in ECOs and another user might be more interested in Items. In such a case, the output will be ordered in such a way that the search result items of interest are displayed in a manner that suits the particular user.

As indicated above, the results may include a main result and secondary results. For example, executing the main SPARQL query may return a main result object and executing the extra SPARQL queries may return an array or list of secondary-result objects. Separate display areas on the user interface may be used for displaying the main results and the secondary results.

In alternative embodiments, other types of generators may be provided to generate queries in languages other than SPARQL. For example, in one embodiment, a PL/SQL query may be generated using ORACLE's sdo_rdf_match( ) PL/SQL procedure, which is an implementation of the actual SPARQL Specification. The sdo_rdf_match( ) procedure enables a SPARQL query to be embedded in an SQL query. Such a query may be executed to query an ontology persisted in a database such as an Oracle database.

Figure 2:
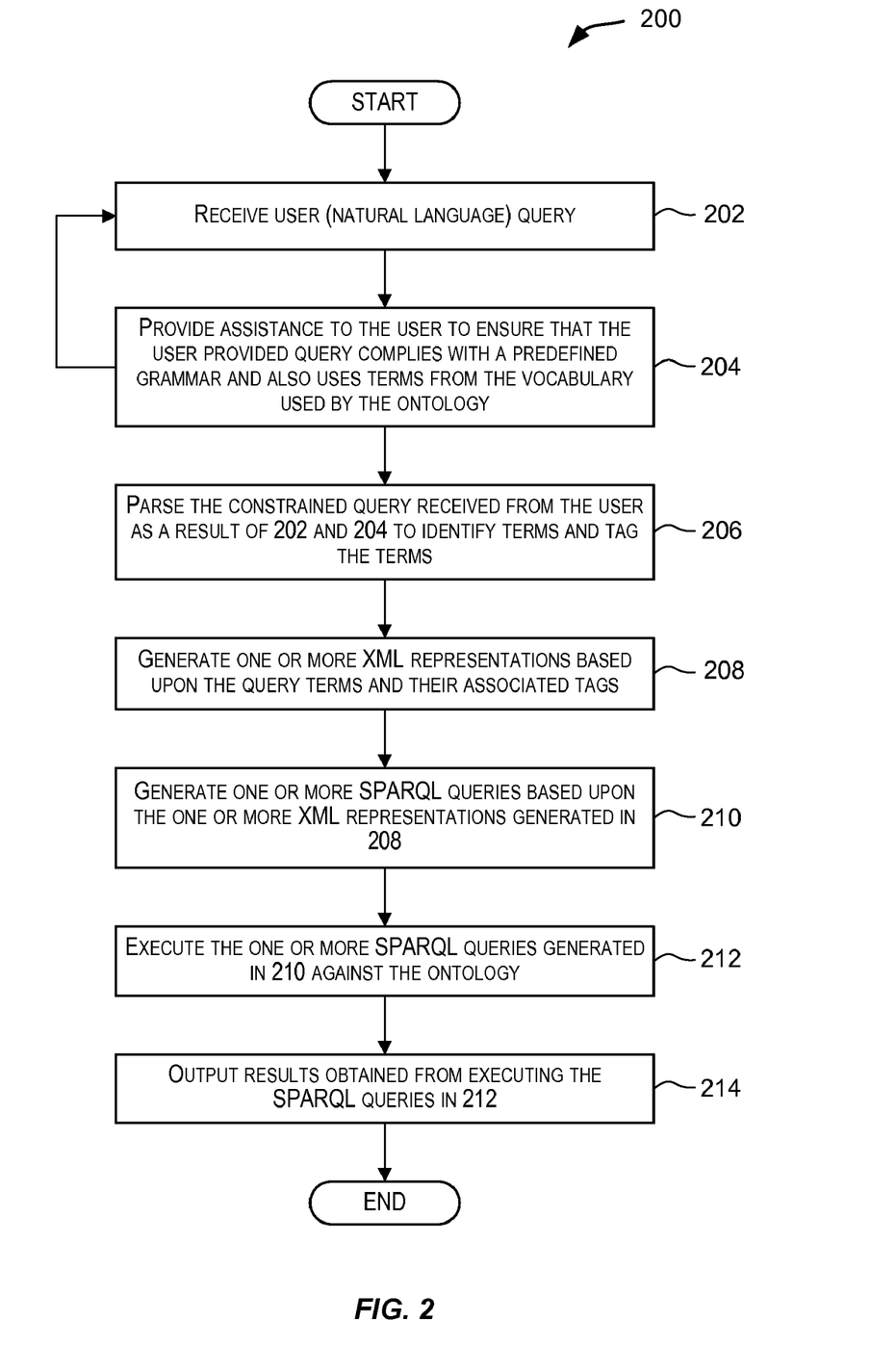
FIG. 2 depicts a simplified flowchart depicting a method for automatically generating one or more queries and using the generated queries to query an ontology according to an embodiment of the present invention.

FIG. 2 depicts a simplified flowchart 200 depicting a method for automatically generating one or more queries and using the generated queries to query an ontology according to an embodiment of the present invention. The method depicted in FIG. 2 may be performed by software (e.g., code, program, instructions) executed by a processor, in hardware, or combinations thereof. The method depicted in FIG. 2 is not intended to limit the scope of the application as recited in the claims. The embodiment described below assumes that the queries are generated in an RDF-compliant query language such as SPARQL. However, in alternative embodiments, the queries may also be generated in other languages capable of querying an ontology such as PL/SQL.

As depicted in FIG. 2, a query entered by a user is received (step 202). The query may be for example a natural language query. Assistance is then provided to the user to ensure that the user provided query complies with a predefined grammar and also uses terms from the vocabulary used by the ontology (step 204). As part of 204, the user query entered in 202 is checked to see if it complies with a predefined grammar and the query comprises words used from the ontology's vocabulary. As part of 204, suggestions may be provided to the user to guide the user in inputting a grammar compliant query that uses terms from the ontology vocabulary. Steps 202 and 204 may be performed iteratively such that in the end a constrained query that complies with the pre-defined grammar and preferably uses terms from the ontology vocabulary is received.

The constrained query received from the user as a result of 202 and 204 is then parsed to identify individual terms comprising one or more words and the query terms are tagged (step 206). The terms may be tagged using parts-of-speech tags such as verb, noun, pronoun, adverb, attribute, instance, next relation, relational operator, etc.

One or more XML representations are then generated based upon the query terms and their associated tags (step 208). The one or more XML representations may include a main XML representation that corresponds to the query input by the user and other extra or secondary XML representations corresponding to extra information that is going to be supplied to the user in addition to the information requested by the user.

One or more SPARQL queries are then generated based upon the one or more XML representations generated in 208 (step 210). The one or more SPARQL queries generated in 210 may comprise a main SPARQL query corresponding to the main XML representation and secondary queries for the secondary XML representations.

The one or more SPARQL queries generated in 210 are then executed against the ontology (step 212). The SPARQL queries generated in 210 may also be executed against multiple ontologies.

Results obtained from executing the SPARQL queries in 212 may then be output (step 214). For example, the results may be output to the user via a user interface. The results may include a main result obtained from executing the main SPARQL query and secondary results obtained from executing the secondary SPARQL queries.

EXAMPLE

This section provides an example of generation of one or more SPARQL queries for a user input query according to an embodiment of the present invention. This example is not intended to limit the scope of the application as recited in the claims.

Assisted constrained sample natural language user query:

Give me eco ids with status='open' and priority='high'

User query after parsing and tagging performed by intermediate query generator 114:

[v]give[/v] [c]eco[/c] [a]ids[/a] [a]status[r]=[/r] [i]'open'[/i] [n]AND[/n] [a]priority [/a] [r]=[/r] [i]'high'[/i]

One or more intermediate representations, including a main XML representation corresponding to the tagged query and secondary XML representations, may then be generated by intermediate XML generator 116. The intermediate main XML representation generated for the main query for the above tagged query may be as follows:

```
<?xml version="1.0" encoding="UTF-8" ?>
    <query>
    <verb>Give</verb>
    <classes>
    <class name="ECO">
        <attributes>
        <attribute name="IDS" relationship="ALL" />
        <attribute name="status" relationship="=">
        <values>
            <value nextRelation="AND">
        <actualValue>
                    'open'
        </actualValue>
        <order>1</order>
        </value>
        </values>
        </attribute>
        <attribute name="priority" relationship="=">
        <values>
            <value nextRelation="NONE">
        <actualValue>
                    'high'
        </actualValue>
        <order>1</order>
        </value>
        </values>
        </attribute>
        </attributes>
    </class>
    </classes>
    </query>
```

SPARQL generator 118 then generates one or more SPARQL queries for the XML representations generated by intermediate XML generator 116. The main SPARQL may be as shown below. In one embodiment, the SPARQL query is in the form of a PL/SQL procedure (shown below) which is an SQL implementation of the SPARQL specification. For example, as shown below. By generating the SPARQL in the form of a PL/SQL procedure, the generated procedure representing the SPARQL query can be directly executed against an ontology persisted in a database such as an ORACLE database. A SPARQL query per the W3C standard may also be generated.

```
SELECT x03 ids, x13 status, x22 priority from TABLE(
    sdo_rdf_match (
    '(?x rdf:type v1:UpdateEngineeringChangeOrderList)
    (?x v1:has_Identification ?x01) (?x01 v2:has_ID ?x02) (?x02 v2:hasValue ?x03)
```

```
        (?x v1:has_Status ?x11) (?x11 v2:has_Code ?x12) (?x12 v2:hasValue ?x13)
        (?x v1:has_PriorityCode ?x21) (?x21 v2:hasValue ?x22) ',
        sdo_rdf_models('ecoebm_data') ,  sdo_rdf_rulebases('rdfs') ,
        sdo_rdf_aliases(
            sdo_rdf_alias('owl', 'http://www.w3.org/2002/07/owl#') ,
            sdo_rdf_alias('v2', http://localhost:8989/EnterpriseObjectLibrary/Release2
                            /Core/Common/V2/MERGED_OWL_3#') ,
            sdo_rdf_alias('v1', 'http://localhost:8989/EnterpriseObjectLibrary/Release2
                            /Core/EBO/EngineeringChangeOrder/
                            MERGED_OWL_1#')),
        ' REGEXP_like(x13 , "open", "i") AND REGEXP_like(x22 , "high", "i") '
    )
)
```

The extra or secondary SPARQL queries generated based on InferenceHelper XML may be as follows:

```
SELECT x03 STATUS, x14 OWNER, x23 ID, x32 DESCRIPTION, x42 PRIORITY from TABLE (
        sdo_rdf_match (
        '(?x rdf:type v1:UpdateEngineeringChangeOrderList)
        (?x v1:has_Status ?x01) (?x01 v2:has_Code ?x02) (?x02 v2:hasValue ?x03)
        (?x v1:has_OwnerPartyReference ?x11) (?x11 v2:has_PartyIdentification
            ?x12) (?x12 v2:has_ID ?x13) (?x13 v2:hasvalue ?x14)
        (?x v1:has_Identification ?x21) (?x21 v2:has_ID ?x22) (?x22 v2:hasValue
            ?x23) (?x v1:has_Description ?x31) (?x31 v2:hasValue ?x32)
        (?x v1:has_PriorityCode ?x41) (?x41 v2:hasValue ?x42) ',
    sdo_rdf_models('ecoebm_data') ,
    sdo_rdf_rulebases('rdfs') ,
    sdo_rdf_aliases(
        sdo_rdf_alias('owl', 'http://www.w3.org/2002/07/owl#') ,
        sdo_rdf_alias('v2', 'http://localhost:8989/EnterpriseObjectLibrary/Release2
                    /Core/Common/V2/MERGED_OWL_3#') ,
        sdo_rdf_alias('v1', 'http://localhost:8989/EnterpriseObjectLibrary/Release2
                    /Core/EBO/EngineeringChangeOrder/MERGED_OWL_1#')),
        'REGEXP_like(x03, "Implemented", "i") AND REGEXP_like(x42, "HIGH", "i") '
    )
)
```

The main and secondary SPARQL queries may then be executed against ontology 104. The results obtained from executing the one or more SPARQL queries, including the main result and the secondary result, may then be output to the user. In one embodiment, the result may be formatted as XML to facilitate transfer between applications. The format of such an XML format may be as follows:

```
<?xml version="1.0" encoding="UTF-8" ?>
<Results>
    <header>
        <summaryResult resultId="ID1 ">
            <summaryName>ECO</summaryName>
            <count>2</count>
        </summaryResult>
        <summaryResult resultId="ID2" >
            <summaryName>ECO</summaryName>
            <count>5</count>
        </summaryResult>
    </header>
    <body>
        <mainResults>
            <resultNode resultId="ID1">
                <columns count="3">
                    <column sequence="1">IDS</column>
                    <column sequence="2">STATUS</column>
                    <column sequence="3">PRIORITY</column>
                </columns>
                <rows>
                    <row>
                        <row sequence="1">PCECONEXT1</row>
                        <row sequence="2">Open</row>
                        <row sequence="3">HIGH</row>
                    </row>
                    <row>
                        <row sequence="1">C0001</row>
                        <row sequence="2">Open</row>
                        <row sequence="3">HIGH</row>
                    </row>
                </rows>
            </resultNode>
        </mainResults>
        <relatedResults>
            <resultNode resultId="ID2">
                <columns count="5">
                    <column sequence="1">STATUS</column>
                    <column sequence="2">OWNER</column>
                    <column sequence="3">ID</column>
                    <column sequence="4">DESCRIPTION</column>
                    <column sequence="5">PRIORITY</column>
                </columns>
                <rows>
                    <row>
                        <row sequence="1">IMPLEMENTED</row>
                        <row sequence="2">joe</row>
                        <row sequence="3">COList272</row>
                        <row sequence="4">MPT6899975</row>
                        <row sequence="5">HIGH</row>
                    </row>
                    <row>
                        <row sequence="1">IMPLEMENTED</row>
                        <row sequence="2">Aditya</row>
```

-continued

```
            <row sequence="3">COList276</row>
            <row sequence="4">MPT6899975</row>
            <row sequence="5">HIGH</row>
        </row>
        <row>
            <row sequence="1">IMPLEMENTED</row>
            <row sequence="2">pravin</row>
            <row sequence="3">COApr13</row>
            <row sequence="4">MPT6899975</row>
            <row sequence="5">HIGH</row>
        </row>
        <row>
            <row sequence="1">IMPLEMENTED</row>
            <row sequence="2">Rajesh</row>
            <row sequence="3">COApr115</row>
            <row sequence="4">MPT6899975</row>
            <row sequence="5">HIGH</row>
        </row>
        <row>
            <row sequence="1">IMPLEMENTED</row>
            <row sequence="2">Rajesh</row>
            <row sequence="3">COList271</row>
            <row sequence="4">MPT6899975</row>
            <row sequence="5">HIGH</row>
        </row>
    </rows>
  </resultNode>
 </relatedResults>
</body>
</Results>
```

As indicated above, the results comprise a main result and a related or secondary result. The main result indicates that ECOs corresponding to the user entered query include two ECOs with ids PCECONEXT1 and C0001 for which status is 'Open'. The secondary result comprises information identifying five additional ECOs with identifiers COList272, COList276, COApr13, COApr115 and COList271 whose priority is HIGH. As shown above, the different attributes are displayed for the related results based upon the information specified in InferenceHelper.xml.

As described above, techniques are provided for automatically generating one or more queries from an assisted constrained natural language query input by the user such that the generated queries are capable of querying an ontology. The ontology may be encoded using RDF. The queries may be generated in an RDF-compliant query language such as SPARQL, using an SQL implementation of the SPARQL specification, and the like. The user may input the query in any simple and easy to use format such as using natural language. The user is guided in providing a query that is compliant to a pre-defined grammar and comprises terms used by the ontology. As a result, the user does not have to be burdened down or be concerned about understanding the intricacies of the underlying ontological representations or the complex syntax of SPARQL or other language used for querying ontologies. Given the constrained natural language approach based upon a predefined configurable grammar and supporting vocabulary, the results obtained from executing the automatically generated queries have a high relevance to the ideal and expected search results. Embodiments of the present invention thus provide a seamless technique to convert constrained natural language queries into queries that are capable of querying ontologies. This makes it easy for users to interact directly with ontological representations, which are becoming more widely used, especially in semantic enterprise applications. The generated queries may be used to query one or more ontologies. In this manner, queries for querying RDF data are automatically generated without the user having to know the language, syntax, or format of the queries used for RDF data querying.

Figure 3:
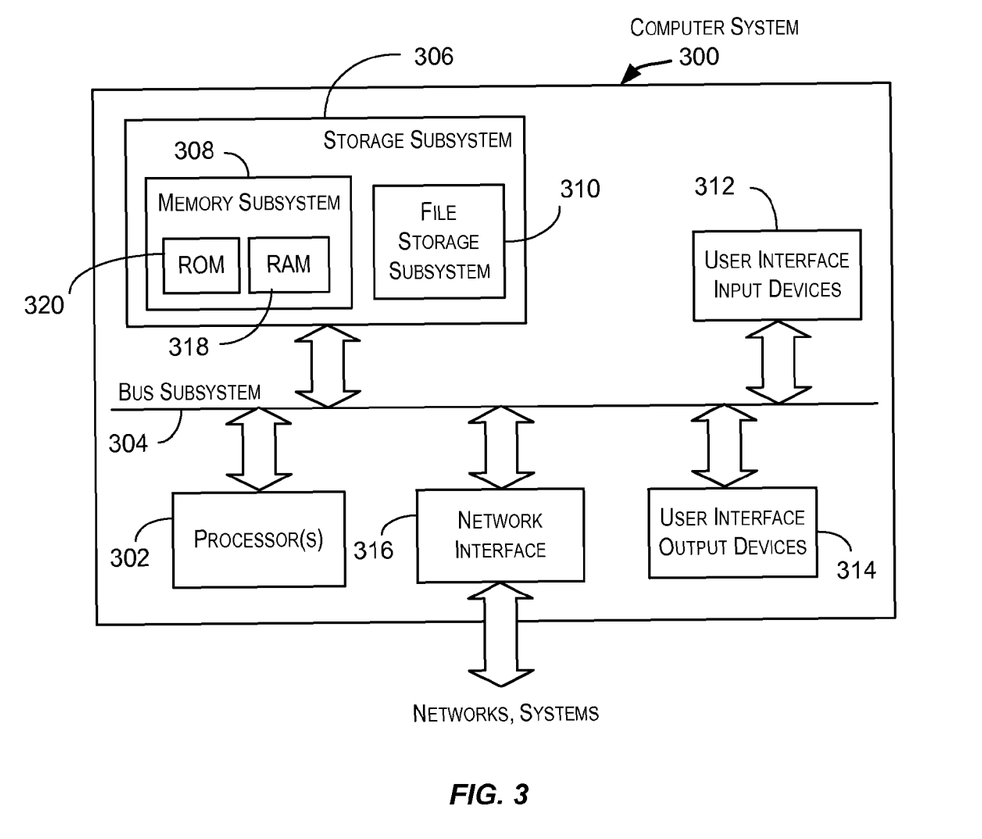
FIG. 3 is a simplified block diagram of a computer system that may be used to practice an embodiment of the present invention.

FIG. 3 is a simplified block diagram of a computer system 300 that may be used to practice an embodiment of the present invention. Computer system 300 may serve as a processing system 102 or a client system 120 depicted in FIG. 1. As shown in FIG. 3, computer system 300 includes a processor 302 that communicates with a number of peripheral subsystems via a bus subsystem 304. These peripheral subsystems may include a storage subsystem 306, comprising a memory subsystem 308 and a file storage subsystem 310, user interface input devices 312, user interface output devices 314, and a network interface subsystem 316.

Bus subsystem 304 provides a mechanism for letting the various components and subsystems of computer system 300 communicate with each other as intended. Although bus subsystem 304 is shown schematically as a single bus, alternative embodiments of the bus subsystem may utilize multiple busses.

Network interface subsystem 316 provides an interface to other computer systems, networks, and portals. Network interface subsystem 316 serves as an interface for receiving data from and transmitting data to other systems from computer system 300.

User interface input devices 312 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 300. A user may use an input device to provide a natural language query.

User interface output devices 314 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 300. Results of executing SPARQL queries may be output to the user via an output device.

Storage subsystem 306 provides a computer-readable medium for storing the basic programming and data constructs that provide the functionality of the present invention. Software (programs, code modules, instructions) that when executed by a processor provide the functionality of the present invention may be stored in storage subsystem 306. These software modules or instructions may be executed by processor(s) 302. Storage subsystem 306 may also provide a repository for storing data used in accordance with the present invention, for example, the data stored in the diagnostic data repository. For example, storage subsystem 306 provides a storage medium for persisting one or more ontologies. Storage subsystem 306 may comprise memory subsystem 308 and file/disk storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 300 can be of various types including a personal computer, a portable computer, a workstation, a network computer, a mainframe, a kiosk, a server or any other data processing system. Due to the ever-changing nature of computers and networks, the description of computer system 300 depicted in FIG. 3 is intended only as a specific example for purposes of illustrating the preferred embodiment of the computer system. Many other configurations having more or fewer components than the system depicted in FIG. 3 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of generating a query for querying an ontology, the method comprising:
   receiving a first query in a first language, wherein the first language is a natural language;
   checking the first query to determine if the first query complies with a predefined grammar and to determine if the first query comprises one or more terms from a vocabulary used in the ontology;
   in response to determining that at least one aspect of the first query does not comply with the predetermined grammar and does not comprise one or more terms from the vocabulary used in the ontology, providing guiding formulation of the first query by providing one or more constraints, wherein the one or more constraints are based upon the predefined grammar and the vocabulary comprising terms used in the ontology, and the predefined grammar is based upon a set of one or more rules;
   based on the one or more constraints, constraining the first query to comply with the predetermined grammar and the vocabulary used in the ontology; and
   generating, based upon the constrained first query, a second query in a second language, wherein the second query complies with the predetermined grammar and the vocabulary used in the ontology, and wherein the second language is different from the first language and the ontology is capable of being queried using the second query in the second language.

2. The method of claim 1 wherein the first query is a natural language query.

3. The method of claim 1 wherein the second language is a Resource Description Framework (RDF) compliant query language for querying an ontology.

4. The method of claim 3 wherein the second language is SPARQL.

5. The method of claim 1 wherein the second language is PL/SQ.

6. The method of claim 1 further comprising:
   executing the one or more queries in the second language against the ontology; and
   outputting results obtained from executing the one or more queries in the second language against the ontology.

7. The method of claim 1 wherein receiving the first query comprises:
   receiving an initial query; and
   determining if the initial query complies with the predefined grammar and comprises one or more terms from the vocabulary.

8. The method of claim 1 wherein generating the one or more queries in the second language comprises:
   parsing the first query to identify a set of terms in the first query;
   associating a tag with each term in the set of terms;
   generating one or more representations based upon the set of terms and tags associated with the terms in the set of terms; and
   generating the one or more queries in the second language based upon the one or more representations.

9. The method of claim 8 wherein the one or more representations are in XML format.

10. The method of claim 8 wherein generating the one or more queries in the second language based upon the one or more representations comprises:
    using mapping information to map at least one term in the set of terms to a term used in the ontology, the mapping information providing a mapping between terms and their corresponding terms used in the ontology.

11. The method of claim 1 wherein the one or more queries in the second language comprise a main query corresponding to the first query and a set of one or more secondary queries configured to gather information in addition to information requested by the first query.

12. A non-transitory computer-readable storage medium storing a plurality of instructions for controlling a processor to generate a query for querying an ontology, the plurality of instructions comprising:
    instructions that cause the processor to receive a first query in a first language, wherein the first language is a natural language;
    instructions that cause the processor to check the first query to determine if the first query complies with a predefined grammar and to determine if the first query comprises one or more terms from a vocabulary used in the ontology;
    in response to determining that at least one aspect of the first query does not comply with the predetermined grammar and does not comprise one or more terms from the vocabulary used in the ontology, instructions that cause the processor to provide guiding formulation of the first query by providing one or more constraints, wherein the one or more constraints are based upon the predefined grammar and the vocabulary comprising terms used in the ontology, and the predefined grammar is based upon a set of one or more rules;

based on the one or more constraints, instructions that cause the processor to constrain the first query to comply with the predetermined grammar and the vocabulary used in the ontology; and instructions that cause the processor to generate, based upon the constrained first query, a second query in a second language, wherein the second query complies with the predetermined grammar and the vocabulary used in the ontology, and wherein the second language is different from the first language and the ontology is capable of being queried using the second query in the second language.

13. The non-transitory computer-readable storage medium of claim 12 wherein the second language is a Resource Description Framework (RDF) compliant query language for querying an ontology.

14. The non-transitory computer-readable storage medium of claim 13 wherein the one or more queries in the second language comprise a main query corresponding to the first query and a set of one or more secondary queries configured to gather information in addition to information requested by the first query.

15. The non-transitory computer-readable storage medium of claim 12 wherein the second language is SQL or SPARQL.

16. The non-transitory computer-readable storage medium of claim 12 wherein the plurality of instructions further comprises:

instructions that cause the processor to execute the one or more queries in the second language against the ontology; and instructions that cause the processor to output results obtained from executing the one or more queries in the second language against the ontology.

17. The non-transitory computer-readable storage medium of claim 12 wherein the instructions that cause the processor to generate the one or more queries in the second language comprise:

instructions that cause the processor to parse the first query to identify a set of terms in the first query;

instructions that cause the processor to associate a tag with each term in the set of terms;

instructions that cause the processor to generate one or more representations based upon the set of terms and tags associated with the terms in the set of terms; and instructions that cause the processor to generate the one or more queries in the second language based upon the one or more representations.

18. The non-transitory computer-readable storage medium of claim 17 wherein the instructions that cause the processor to processor to generate the one or more queries in the second language based upon the one or more representations comprise:

instructions that cause the processor to use mapping information to map at least one term in the set of terms to a term used in the ontology, the mapping information providing a mapping between terms and their corresponding terms used in the ontology.

19. A system for generating a query for querying an ontology, the system comprising:

a memory configured to store the ontology;

a processor coupled to the memory, wherein the processor is configured to:

receive a first query in a first language, wherein the first language is a natural language;

check the first query to determine if the first query complies with a predefined grammar and to determine if the first query comprises one or more terms from a vocabulary used in the ontology;

in response to determining that at least one aspect of the first query does not comply with the predetermined grammar and does not comprise one or more terms from the vocabulary used in the ontology, provide guiding formulation of the first query by providing one or more constraints, wherein the one or more constraints are based upon the predefined grammar and the vocabulary comprising terms used in the ontology, and the predefined grammar is based upon a set of one or more rules;

based on the one or more constraints, constrain the first query to comply with the predetermined grammar and the vocabulary used in the ontology; and generate, based upon the constrained first query, a second query in a second language, wherein the second query complies with the predetermined grammar and the vocabulary used in the ontology, and wherein the second language is different from the first language and the ontology is capable of being queried using the second query in the second language.

20. The system of claim 19 wherein the second language is a Resource Description Framework (RDF) compliant query language for querying an ontology.

21. The system of claim 19 wherein the processor is configured to:

parse the first query to identify a set of terms in the first query;

associate a tag with each term in the set of terms;

generate one or more representations based upon the set of terms and tags associated with the terms in the set of terms; and generate the one or more queries in the second language based upon the one or more representations.

* * * * *

UNITED STATES PATENT AND TRADEMARK OFFICE
CERTIFICATE OF CORRECTION

| | | |
|---|---|---|
| PATENT NO. | : 8,140,556 B2 | Page 1 of 1 |
| APPLICATION NO. | : 12/356314 | |
| DATED | : March 20, 2012 | |
| INVENTOR(S) | : Rao et al. | |

It is certified that error appears in the above-identified patent and that said Letters Patent is hereby corrected as shown below:

In column 10, line 5, delete "<OtherColumnsToBeDispalyed>" and insert -- <OtherColumnsToBeDisplayed> --, therefor.

In column 10, line 9, delete "</OtherColumnsToBeDispalyed>" and insert -- </OtherColumnsToBeDisplayed> --, therefor.

In column 10, line 22-23, delete "OtherColumnsToBeDispalyed" and insert -- OtherColumnsToBeDisplayed --, therefor.

In column 10, line 24, delete "generated" and insert -- generated. --, therefor.

In column 21, line 50, in Claim 18, before "generate" delete "processor to".

Signed and Sealed this
Fifth Day of June, 2012

David J. Kappos
*Director of the United States Patent and Trademark Office*